United States Patent
Palmieri

(10) Patent No.: US 9,182,147 B2
(45) Date of Patent: Nov. 10, 2015

(54) VACUUM SOLAR THERMAL PANEL WITH NON-EVAPORABLE GETTER PUMP ASSEMBLY

(75) Inventor: Vittorio Palmieri, Geneva (CH)

(73) Assignee: TVP Solar SA, Geneva (CH)

(*) Notice: Subject to any disclaimer, the term of this patent is extended or adjusted under 35 U.S.C. 154(b) by 582 days.

(21) Appl. No.: 13/556,128

(22) Filed: Jul. 23, 2012

(65) Prior Publication Data

US 2013/0025584 A1 Jan. 31, 2013

(30) Foreign Application Priority Data

Jul. 27, 2011 (EP) .................................. 11175631

(51) Int. Cl.
*F24J 2/04* (2006.01)
*F24J 2/46* (2006.01)
*F24J 2/50* (2006.01)

(52) U.S. Cl.
CPC ................ *F24J 2/4612* (2013.01); *F24J 2/507* (2013.01); *Y02E 10/40* (2013.01)

(58) Field of Classification Search
CPC ........... F24J 2/4612; F24J 2/507; Y02E 10/40
USPC ......................... 126/653, 634, 646
See application file for complete search history.

(56) References Cited

U.S. PATENT DOCUMENTS 4,579,107 A 4/1986 Deakin
2007/0039611 A1* 2/2007 Benvenuti ..................... 126/652

FOREIGN PATENT DOCUMENTS

EP        1706678 A1    10/2006
JP      58-049857 A     3/1983
WO   WO2009/149751 A1  12/2009

OTHER PUBLICATIONS

European Patent Office, European Search Report, Dec. 14, 2011, published by EPO, The Hague, Netherlands, 2 pages.

* cited by examiner

*Primary Examiner* — Alfred Basichas
(74) *Attorney, Agent, or Firm* — Hickman Palermo Becker Bingham LLP

(57) ABSTRACT

Non-evaporable getter pump assembly (1) for a vacuum solar thermal panel, ensuring a quick and efficient heating of the getter pump, comprising: a solar receiver plate (2), having an outer side (20) predisposed for absorbing solar radiation; at least a first supporting plate (3a); at least a non-evaporable getter element (4) interposed between an inner side (21) of the solar receiver plate (2) and the first supporting plate (3a); and holding means for pressing the solar receiver plate (2) and the first supporting plate (3a) against one another sandwiching the non-evaporable getter element (4) between the two plates (2, 3a).

17 Claims, 4 Drawing Sheets

VACUUM SOLAR THERMAL PANEL WITH NON-EVAPORABLE GETTER PUMP ASSEMBLY

BENEFIT CLAIM

The present application claims the benefit under 35 U.S.C. 119 of priority from European Patent Office (EPO) application 11175631.8, filed Jul. 27, 2011, the entire contents of which are hereby incorporated by reference for all purposes as if fully set forth herein.

FIELD OF APPLICATION

The present invention relates to a non-evaporable getter pump assembly for a vacuum solar thermal panel and to a related vacuum solar thermal panel comprising said assembly.

PRIOR ART

As it is well known, vacuum solar thermal panels comprise a vacuum-tight envelope wherein at least a front plate is transparent to solar radiation. The panel comprises heat absorbers disposed within the vacuum envelope and a pipe conveying a heat transfer fluid.

The solar radiation thus enters the vacuum envelope through the front plate, is collected by the heat absorbers and converted into heat. The converted heat is then transferred to the heat transfer fluid flowing into the pipe.

The vacuum within the envelope, which is a peculiarity of the present kind of solar thermal panels, greatly reduces convection heat losses resulting in higher efficiency of the devices. In state-of-the-art high vacuum panels the internal pressure should be kept below $10^{-3}$ Torr in order for convection losses to be negligible.

In order to maintain said high vacuum condition over time, a getter material, which is able to capture the residual gas molecules by means of absorption and or adsorption, is enclosed within the vacuum envelope. Such an arrangement is usually known as a getter pump.

In particular, non-evaporable getters are mostly used in vacuum solar thermal panels, since they are better suited to absorb hydrogen gas molecules that would build up pressure within the vacuum-tight envelope.

However, adsorption of the gas molecules quickly results in saturation of the non-evaporable getter surface and consequent loss of its pumping capacity. In order to avoid this, the non-evaporable getters shall be reactivated through heating, which helps the adsorbed molecules to diffuse from the surface to the bulk.

The above-mentioned reactivation may be obtained through Joule heating. However, such a method requires electric vacuum feedthroughs, which are expensive and can develop leaks over time. Moreover, a source of electric power may not be available at the panels' installation site.

An alternative method for heating the getter pump, disclosed for instance in patent application WO 2009/149751, is placing them in an envelope with selectively coated surfaces inside the panel. Such an envelope will absorb the solar radiation heating the non-evaporable getter.

However, the non-evaporable getters placed within the envelope are thermalized mainly by radiation, since they are in loose mechanical contact with the envelope walls. Therefore, the getters may need a long time to heat up to the desired temperature.

Moreover, since the temperature reached by the non-evaporable getters is defined by the absorbtivity and emissivity of the selectively coated surfaces of the envelope, there is no easy way of varying said temperature in a re-design step.

The technical problem underlying the present invention is therefore that of providing a non-evaporable getter pump assembly for a vacuum solar thermal panel ensuring a quick and efficient heating of the getter pump without resorting to external devices.

SUMMARY OF THE INVENTION

A solution to the above-mentioned technical problem is provided by a non-evaporable getter pump assembly for a vacuum solar thermal panel comprising: a solar receiver plate, having an outer side predisposed for absorbing solar radiation (for instance by means of a selective coating); at least a first supporting plate; at least a non-evaporable getter element interposed between an inner side of the solar receiver plate and the first supporting plate; and holding means for pressing the solar receiver plate and the first supporting plate against one another sandwiching the non-evaporable getter element between the two plates.

The idea underlying the present invention is that of ensuring an good mechanical contact between the supporting structure featuring the solar receiver plate and the non-evaporable getter elements, which may be under the common form of sintered pills. In such a way, the getter elements are heated mainly by conduction, and a quick and efficient heating is achieved.

The non-evaporable getter pump assembly may advantageously comprise a plurality of supporting plates piled on top of each other, at least a non-evaporable getter element being interposed between each couple of successive holder plates, said holding means being also predisposed for pressing together the successive supporting plates sandwiching the non-evaporable getter element placed in-between.

Thanks to the supporting structure described above, a great number of non-evaporable getter elements may be arranged together with a single solar receiver plate.

The holding means may comprise a fastener (for instance a rivet or a bolt and screw arrangement) connecting the solar receiver plate with the at least one supporting plate. If the supporting plates are a plurality, the fastener may cross all of them, connecting these together and with the solar receiver plate.

An elastic washer surrounding the fastener may be interposed between the solar receiver plate and the first supporting plate, as well as between each couple of successive supporting plates. The elastic washers are then squeezed between the plates when the fastener is positioned.

The fastener may cross the first supporting plate in a central position, a plurality of non-evaporable getter elements being disposed on the first supporting plate surrounding the fastener.

Said first supporting plate may advantageously comprise raised portions defining housings for the non-evaporable getter elements. Such raised portions are easily manufactured by known metal forming techniques.

Preferably, the raised portions may comprise wall portions raised on the edges of the first supporting plate and arm portions dividing said first supporting plate into equal portions defining the housings.

Every supporting plate may have the same shape as the first supporting plate, and the successive supporting plates may be rotated by 45° with respect to one another, in order to assure the best possible mechanical contact between the plates and the non-evaporable getter elements Due to its high thermal conductivity, the supporting plates as well as the fastener are preferably made of copper. The elastic washer can be made of carbon fibre or copper wire mesh also to ensure high thermal conductivity A solution to the above-mentioned technical problem is also provided by a vacuum solar thermal panel comprising a non-evaporable getter pump assembly as previously described.

Further characteristics and advantages shall be clearer from the detailed description, outlined hereinafter, of a preferred but not exclusive embodiment of the present finding, with reference to the attached figures provided for exemplifying and non-limiting purposes.

DETAILED DESCRIPTION

Figure 4:
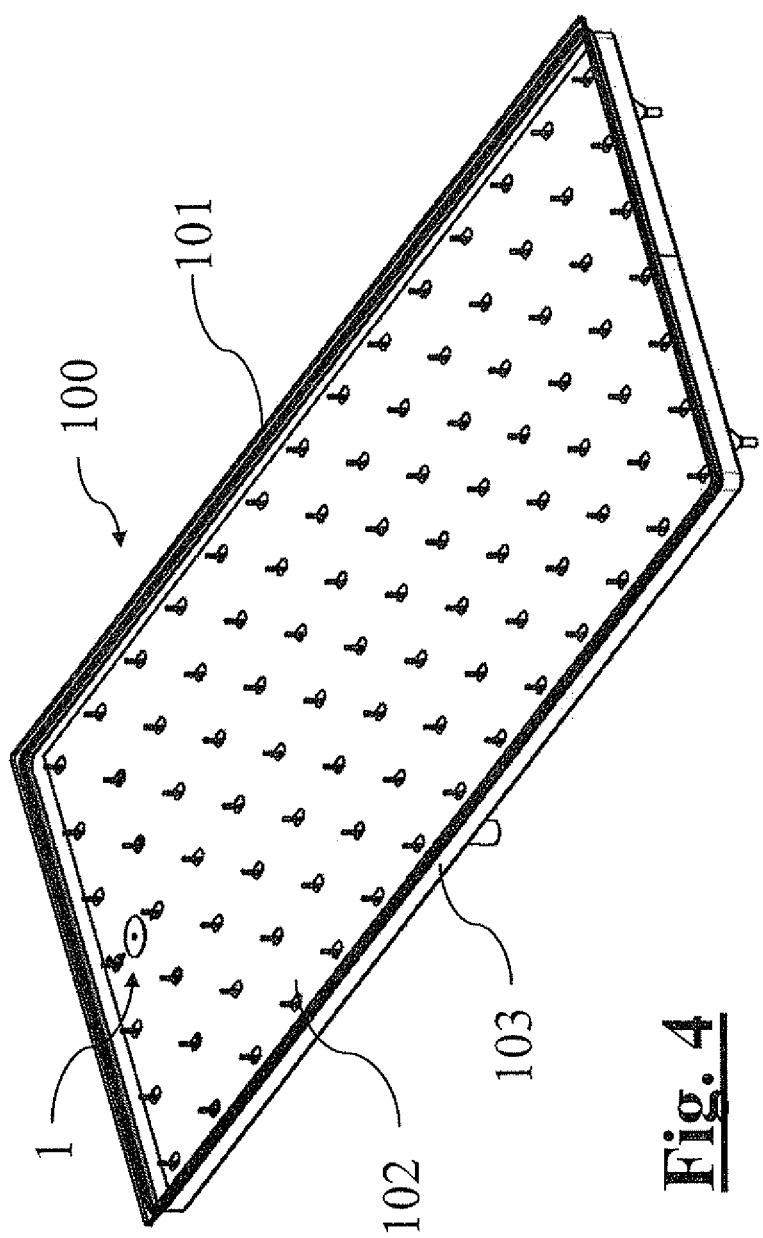
FIG. 4 shows a perspective view of a vacuum solar thermal panel comprising the present invention.

With reference to the figures, and in particular to FIG. 4, a vacuum solar thermal panel according to the present invention is shown and globally indicated with 100.

The vacuum solar thermal panel 100 comprises a vacuum-tight envelope 101, which in turn is made up of a front glass plate 102, transparent to solar radiation, and a support structure 103 meant to support the front glass plate 102.

Heat-absorbing means of the known type are enclosed within the vacuum-tight envelope; said absorbing means are thermally connected to a pipe crossing the vacuum-tight envelope 101. The heat-absorbing means and the pipe have been omitted in the figures for simplification purpose.

Figure 1:
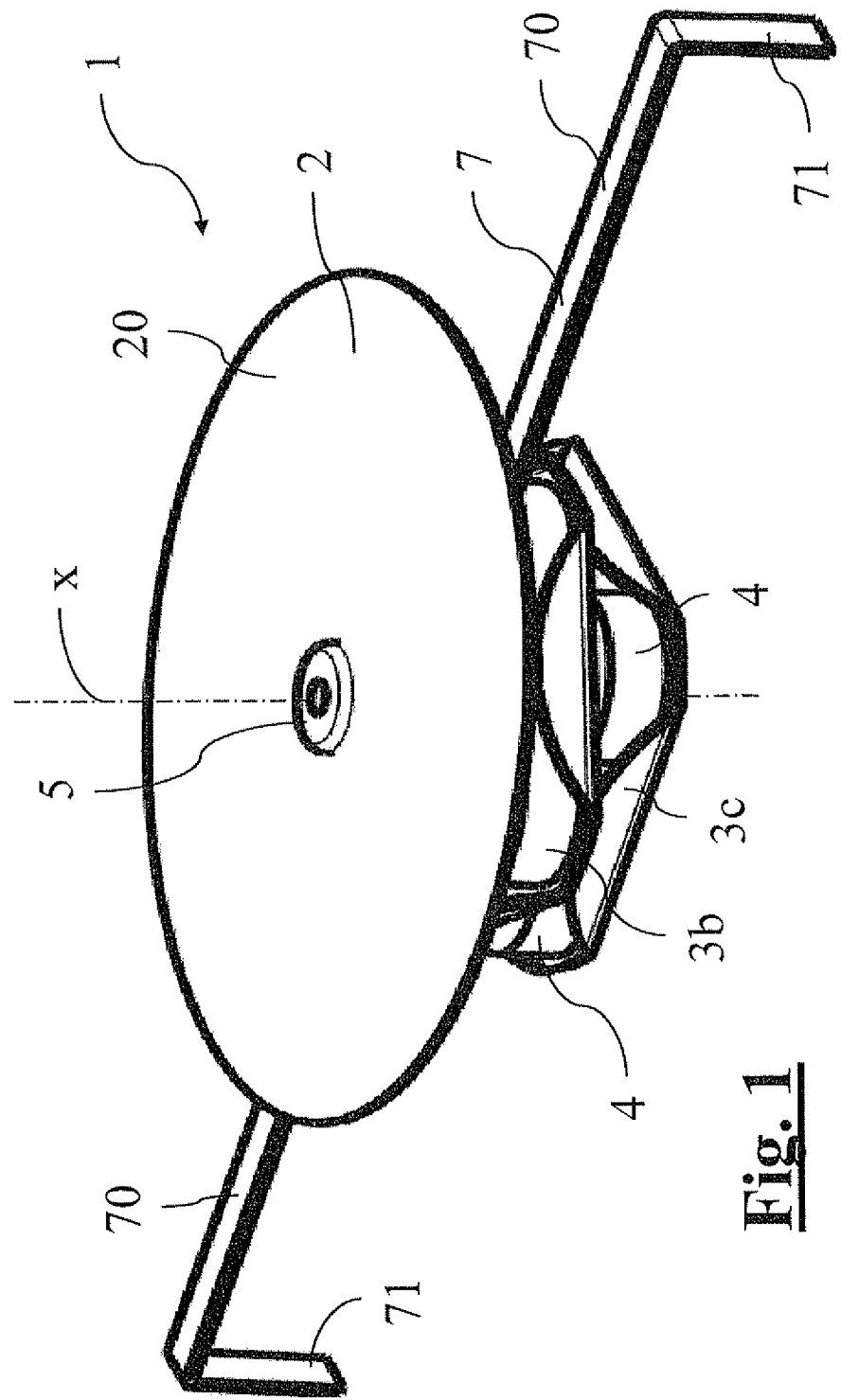
FIG. 1 shows a perspective view of a non-evaporable getter pump assembly according to the present invention.
Figure 2:
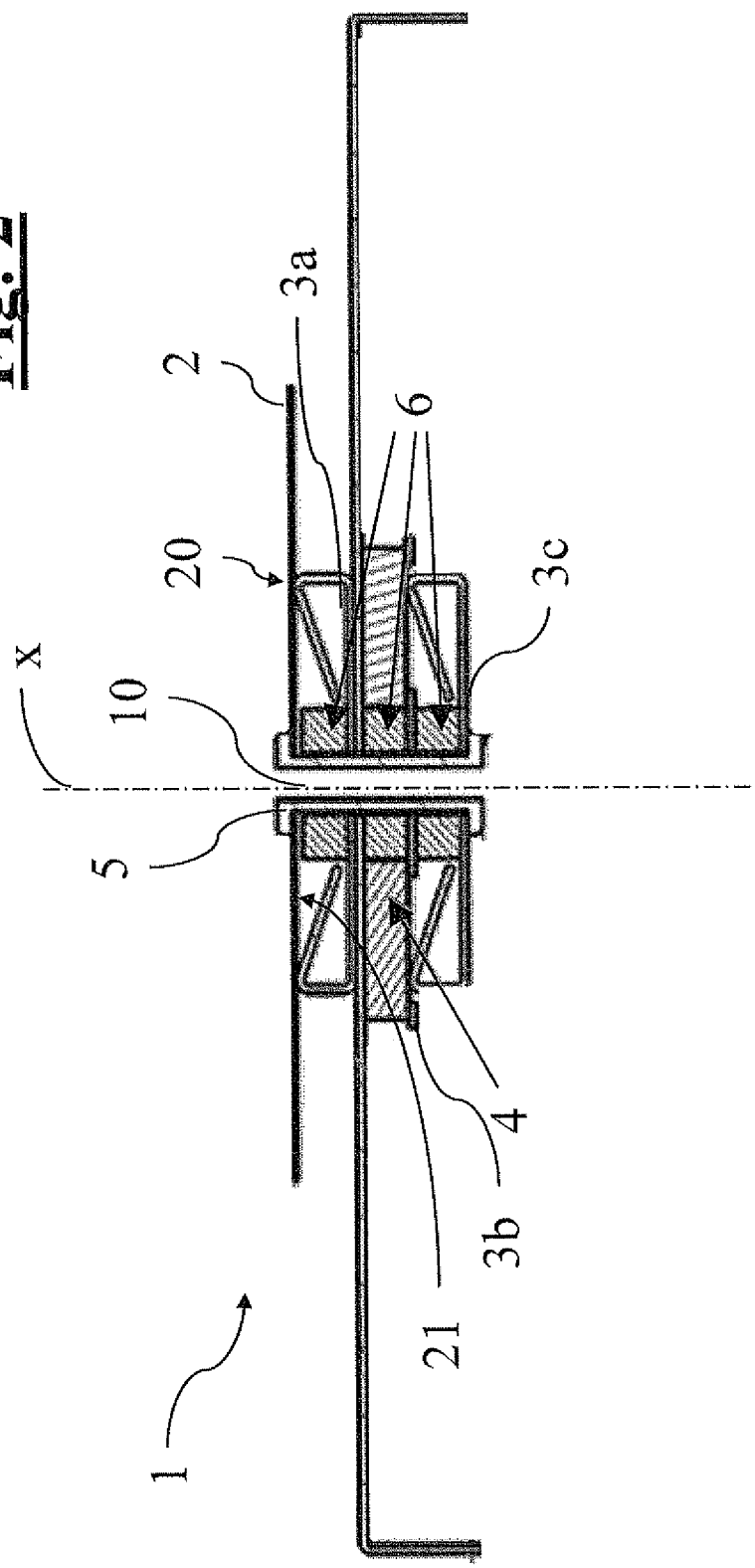
FIG. 2 shows a cross-section of the getter pump assembly of FIG. 1.
Figure 3:
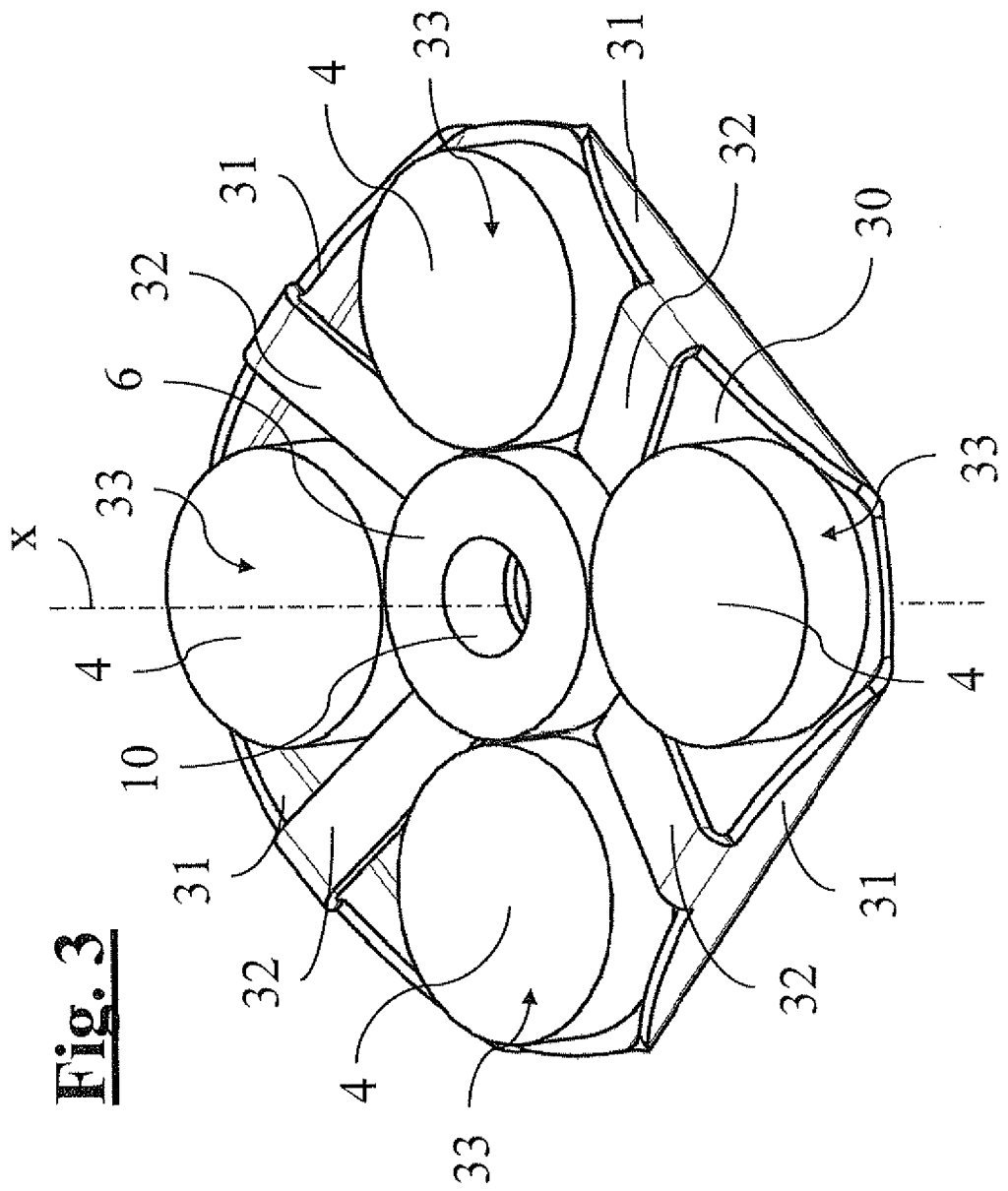
FIG. 3 shows a perspective view of a supporting plate being part of the getter pump assembly of FIG. 1.

The vacuum solar thermal panel 100 comprises a non-evaporable getter pump assembly 1 according to the present invention, which is represented in more details in FIGS. 1 and 2.

The non-evaporable getter pump assembly 1 is shown in these drawings according to an ideal working configuration. Hereinafter in the present description the positions and orientations, relative and absolute, of the various elements which make up the assembly, defined by means of terms such as top and bottom, above and below, horizontal and vertical, or equivalent terms, should always be interpreted with reference to this configuration.

The non-evaporable getter pump assembly, enclosed within the vacuum-tight envelope 101, comprises a supporting structure bearing a plurality of non-evaporable getter elements 4 in the form of sintered pills of known type (for instance SAES st2002).

The supporting structure comprises three supporting plates (from top to bottom: first supporting plate 3a, second supporting plate 3b, third supporting plate 3c), piled on top of each other and topped with a solar receiver plate 2.

An elastic washer 6 is interposed between each plate and the following. The non-evaporable getter pills are disposed, in groups of four, on top of each supporting plate 3a, 3b, 3c. Hence, four pills and an elastic washer are sandwiched between the first supporting plate 3a and an inner side 21 of the solar receiver plate 2; four more pills and one more washer are sandwiched between the second supporting plate 3b and the first 3a; and other four pills with another washer are sandwiched between the third supporting plate 3c and the second 3b. Given that the thickness of the non-evaporable getter pills is about 4 mm, the successive plates are spaced apart by such a distance.

The solar receiver plate 2 is disc-shaped and features an outer side 21 (opposite to the supporting plates 3a, 3b, 3c) selectively coated in order to absorb solar radiation, facing the front glass plate 102 of the vacuum solar thermal panel 100.

In the described preferred embodiment, the solar receiver plate 2 has a 95% absorptivity and a 5% emissivity (at 100° C.), and a diameter of 50 mm.

The three supporting plates 3a, 3b, 3c and the solar receiver plate 2 feature a central bore, which is aligned to the elastic washers 6 in order to define a central channel 10, extending along a central axis x orthogonal to the planes, said channel hosting a fastener 5. The fastener 5, which is a copper rivet in the preferred embodiment herein described, has one head sticking out of the outer side 21 of the solar receiver plate 2 while the other head emerges from the bottom side of the third supporting plate 3c. The fastener action presses together the four plates 3a, 3b, 3c, 2, compressing the interposed elastic washers 6 and tightly holding the non-evaporable getter pills between the opposite surfaces of the adjacent plates.

The three supporting plates 3a, 3b, 3 share the same size and shape.

Every plate is made out of a copper metal sheet featuring a flat and substantially squared central portion 30, in the centre of which the elastic washer 6 is placed, and raised portions 31, 32 defining four housings 33 for the non-evaporable getter pills.

The raised portions comprise four semi-circular wall portions 31, bent vertically upwards with respect to the central portion 30, delimiting the four sides of the squared central portion 30. From the top of each wall portion 31 stems a corresponding elongated arm portion 32, which is inclined downwards and towards the central axis x. The free end of each arm portion 32 contacts the central portion 30 of the supporting plate at the periphery of the elastic washer 6. The supporting plate is thus divided in four quadrants or portions by the inclined arm portions 32.

The arm portions 32 together with the wall portions 31, define the four housings for the non-evaporable getter pills corresponding to the four quadrants of the plate.

It should be noted that the raised portions 31, 32, being manufactured out of a folded metal sheet, are compliant in nature and may slightly deform when pressed between two opposite plates packed together by means of the fastener 5.

The lateral dimension of the supporting plates is about half the diameter of solar receiver plate 2.

The successive supporting plates 3a, 3b, 3c are rotated by 45° with respect to one another: so the second plate 3b is rotated by 45° with respect to the first 3a and the third 3c is rotated by 45° with respect to the second 3b. In such a way, the non-evaporable getter pills are not directly superposed and the best possible mechanical contact between pills and plates is achieved.

The whole supporting structure previously described is attached to the vacuum solar thermal panel 100 by means of a support bracket 7, which may be attached either to the absorbing means or to the support structure 103 of the vacuum solar thermal panel 100.

The support bracket 7 is made out of a suitable low thermal conductivity material, in the present embodiment a 0.2 mm thick, 3 mm wide strip of stainless steel. The support bracket has a support beam 70, which is fixed at its central portion between the second 3b and first 3a support plates, and lateral uprights 71 fixing the structure to the vacuum solar thermal panel.

An advantage of the non-evaporable getter pump assembly and of the vacuum solar thermal panel according to the present invention is that the temperature reached by the non-evaporable getter may be easily varied by changing the solar receiver plate and its related parameters. A solar receiver plate with the above described characteristics will heat the non-evaporable getter pills at approximately 250° C. when illuminated with an irradiance of 1000 W/m$^2$, but if needed said temperature may be easily adjusted by varying for instance the diameter of the solar receiver plate.

A further advantage of the present invention lies in the extreme compactness of the non-evaporable getter pump assembly, which is able to hold a plurality of sintered pills in a limited space without hindering the correct functioning of the vacuum solar thermal panel.

A further advantage of the present invention derives from the easy manufacturing of the non-evaporable getter pump assembly, which is obtained by simple metal forming operations without resorting to expensive or complicated manufacturing techniques.

A further advantage of the present invention stems from the above-mentioned choice of the materials, which ensures an excellent thermal conductivity from the solar receiver plate to the getter pills and avoids heat dissipation toward the rest of the vacuum solar thermal panel.

Obviously, the afore-described finding may be subjected to numerous modifications and variants—by a man skilled in the art with the aim of meeting the possible and specific requirements—all falling within the scope of protection of the invention as defined by the following claims.

What is claimed is:

1. A vacuum solar thermal panel comprising a vacuum-tight envelope and a non-evaporable getter pump assembly, the non-evaporable getter pump comprising a solar receiver plate other than a main heat absorber plate of the vacuum solar thermal panel, having an outer side predisposed for absorbing solar radiation; at least a first supporting plate distinct from said vacuum-tight envelope; at least a non-evaporable getter element interposed between an inner side of the solar receiver plate and the first supporting plate; and holding means for pressing the solar receiver plate and the first supporting plate against one another sandwiching the non-evaporable getter element between the two plates.

2. The vacuum solar thermal panel according to claim 1, comprising a plurality of supporting plates piled on top of each other, at least a non-evaporable getter element being interposed between each couple of successive holder plates, said holding means being also predisposed for pressing together the successive supporting plates sandwiching the non-evaporable getter element placed in-between.

3. The vacuum solar thermal panel according to claim 2, wherein the holding means comprise a fastener connecting the solar receiver plate with the at least one supporting plate and wherein said fastener crosses the plurality of supporting plates connecting them together and connecting these with the solar receiver plate.

4. The vacuum solar thermal panel according to claim 3, comprising: an elastic washer interposed between the solar receiver plate and the first supporting plate and surrounding the fastener; and a further elastic washer interposed between each couple of successive supporting plates and surrounding the fastener.

5. The vacuum solar thermal panel according to claim 1, wherein the holding means comprise a fastener connecting the solar receiver plate with the at least one supporting plate.

6. The vacuum solar thermal panel according to claim 5, further comprising an elastic washer interposed between the solar receiver plate and the first supporting plate and surrounding the fastener.

7. A non-evaporable getter pump assembly for a vacuum solar thermal panel comprising: a solar receiver plate, having an outer side predisposed for absorbing solar radiation; at least a first supporting plate; at least a non-evaporable getter element interposed between an inner side of the solar receiver plate and the first supporting plate; and holding means for pressing the solar receiver plate and the first supporting plate against one another sandwiching the non-evaporable getter element between the two plates, comprising a plurality of supporting plates piled on top of each other, at least a non-evaporable getter element being interposed between each couple of successive holder plates, said holding means being also predisposed for pressing together the successive supporting plates sandwiching the non-evaporable getter element placed in-between, wherein the holding means comprise a fastener connecting the solar receiver plate with the at least one supporting plate and wherein said fastener crosses the plurality of supporting plates connecting them together and connecting these with the solar receiver plate, wherein the fastener crosses the first supporting plate in a central position, a plurality of non-evaporable getter elements being disposed on the first supporting plate surrounding the fastener; and wherein every supporting plate has the same shape as the first supporting plate.

8. The non-evaporable getter pump assembly according to claim 7, wherein the holding means comprise a fastener connecting the solar receiver plate with the at least one supporting plate.

9. The non-evaporable getter pump assembly according to claim 8, wherein the fastener crosses the first supporting plate in a central position, a plurality of non-evaporable getter elements being disposed on the first supporting plate surrounding the fastener.

10. The non-evaporable getter pump assembly according to claim 9, wherein said first supporting plate comprises raised portions defining housings for the non-evaporable getter elements.

11. The non-evaporable getter pump assembly according to claim 10, wherein said raised portions comprise wall portions raised on the edges of the first supporting plate and arm portions dividing said first supporting plate into equal portions defining the housings.

12. The non-evaporable getter pump assembly according to claim 8, wherein the at least one supporting plate as well as the fastener are made of copper.

13. The non-evaporable getter pump assembly according to claim 8, wherein the fastener is a rivet.

14. The non-evaporable getter pump assembly according to claim 8, further comprising an elastic washer interposed between the solar receiver plate and the first supporting plate and surrounding the fastener.

15. The non-evaporable getter pump assembly according to claim 7, comprising: an elastic washer interposed between the solar receiver plate and the first supporting plate and surrounding the fastener; and a further elastic washer interposed between each couple of successive supporting plates and surrounding the fastener.

16. The non-evaporable getter pump assembly according to claim 7 wherein the successive supporting plates are rotated by 45° with respect to one another.

17. The non-evaporable getter pump assembly according to claim 7, wherein the at least one non-evaporable getter element is under the form of a sintered pill.

* * * * *